(12) United States Patent
Chan et al.

(10) Patent No.: US 7,515,695 B1
(45) Date of Patent: Apr. 7, 2009

(54) CLIENT CUSTOMIZABLE INTERACTIVE VOICE RESPONSE SYSTEM

(75) Inventors: Kevin Chan, Ryde (AU); Neil Hepworth, Artarmon (AU); Melanie L. Smith, Rozelle (AU)

(73) Assignee: Avaya Inc., Basking Ridge, NJ (US)

( * ) Notice: Subject to any disclaimer, the term of this patent is extended or adjusted under 35 U.S.C. 154(b) by 920 days.

(21) Appl. No.: 10/736,923

(22) Filed: Dec. 15, 2003

(51) Int. Cl.
*H04M 11/06* (2006.01)

(52) U.S. Cl. ............ 379/88.18; 379/88.23; 379/221.09; 704/270.1; 709/227

(58) Field of Classification Search .............. 379/88.18, 379/88.23, 221.09; 219/132; 704/270.1; 709/227
See application file for complete search history.

(56) References Cited

U.S. PATENT DOCUMENTS

| | | | |
|---|---|---|---|
| 5,479,490 A | 12/1995 | Nakashima | |
| 5,608,788 A | 3/1997 | Demlow et al. | |
| 5,671,328 A | 9/1997 | Fitzpatrick et al. | |
| 5,737,393 A | 4/1998 | Wolf | |
| 5,748,843 A | 5/1998 | Peck et al. | |
| 5,832,059 A | 11/1998 | Aldred et al. | |
| 5,835,571 A | 11/1998 | Johnson | |
| 5,873,064 A | 2/1999 | De Armas et al. | |
| 5,912,952 A | 6/1999 | Brendzel | |
| 5,920,841 A | 7/1999 | Schottmuller et al. | |
| 6,064,730 A | 5/2000 | Ginsberg | |
| 6,101,472 A | 8/2000 | Giangarra et al. | |
| 6,157,848 A | 12/2000 | Bareis et al. | |
| 6,263,375 B1 | 7/2001 | Ortega | |
| 6,272,216 B1 | 8/2001 | Vaios | |
| 6,504,917 B1 | 1/2003 | Flint et al. | |
| 6,519,246 B1 | 2/2003 | Strahs | |
| 6,658,414 B2 | 12/2003 | Bryan et al. | |
| 6,748,066 B1 | 6/2004 | Espejo et al. | |
| 6,978,129 B1 | 12/2005 | Peon et al. | |
| 7,130,391 B2 | 10/2006 | Janakiraman et al. | |
| 7,220,941 B2 * | 5/2007 | Niedereder et al. | ......... 219/132 |
| 2003/0043978 A1 * | 3/2003 | Gallagher | ................. 379/88.18 |
| 2004/0054538 A1 | 3/2004 | Kotsinadelis | |

OTHER PUBLICATIONS

John H.L. Hansen and Levent M. Arslan, *Foreign Accent Classificatino Using Source Generator Based Prosodic Features*, IEEE Proc. ICASSP, vol. 1, Detroit USA (May 1995), pp. 836-839.

Levent M. Arslan and John H.L. Hansen, *Language Accent Classification in American English*, Robust Speech Processing Laboratory, Duke University Department of Electrical Engineering, Durham, NC, Technical Report RSPL-96-7, (Rev. Jan. 29, 1996), pp. 1-16.

(Continued)

*Primary Examiner*—Gerald Gauthier
(74) *Attorney, Agent, or Firm*—Sheridan Ross P.C.

(57) ABSTRACT

An Interactive Voice Response unit (IVR) is provided that includes a menu structure comprising a plurality of menus, each menu comprising a plurality of options that are selectable by a user, wherein the plurality of menus and each menu's respective plurality of options define a plurality of potential navigation paths for the user through the menu structure and a processor operable to receive, from the user, a request to change the menu structure; effect the requested change to the menu structure; and associate the changed menu structure with the requesting user.

49 Claims, 11 Drawing Sheets

OTHER PUBLICATIONS

Levent M. Arslan, *Foreign Accent Classification in Amercian English,* Department of Electrical Computer Engineering, Duke University, Thesis, (1996), pp. 1-200.

Kevin Jepson, "Ala. CU Believes in Marketing Via ATMs," The Credit Union Journal (May 19, 2003), 1 page.

Kevin Jepson, "Ala. Credit Union Believes in Marketing Via ATMs," In The News (Aug. 21, 2003), 1 page.

"Personalizing Call Center Interactions with U-dial," Solution Blueprint Data Sheet Cross Industry (2002), 2 pages.

* cited by examiner

| First Name | Last Name | Shortcut Navigation Path | New Option Number | Prompt Location |

| First Name | Last Name | Hidden Menu Option | Navigation Path | Prompt Location |

| First Name | Last Name | Navigation Path | Identification and PIN/Password | File/Path to File/Prompt Location |

CLIENT CUSTOMIZABLE INTERACTIVE VOICE RESPONSE SYSTEM

FIELD OF THE INVENTION

The present invention is generally directed to interactive voice response systems and particularly to customizable interactive voice response systems.

BACKGROUND

Interactive Voice Response (IVR) systems provide a set menu of options to callers and navigation paths from one menu option to another depending on the customer's menu choice. Customers respond to an IVR prompt using touch-tone telephones or speak their response if the IVR has an automatic speech response (ASR) interface. The company paying for the IVR typically provides requirements for the IVR design and maintains the IVR. The menu of options may provide information about the company, access to employees, access to customer account information, and access to an operator, etc.

FIGS. 1A and 1B provide an example of a typical bank IVR including some but not all of the lower-level menu options. FIGS. 1A and 1B includes the lower-level menu options to transfer funds from one existing account to another existing account within the same bank. As is evident, from FIGS. 1A and 1B, if a customer desires to transfer funds from one bank account to another, the customer must listen to a series of top-level menu options before the opportunity arises to transfer funds. In step 10, a customer dials the access number for the ABC Bank IVR. In step 20, the customer hears a welcome prompt. In step 30, the customer hears the prompt: "To access new account information, press or say 1 (the keypad number 1 on the touch tone phone). To access existing account information, press or say 2 (the keypad number 2 on the touch tone phone). To access bank information, press or say 3 (the keypad number 3 on the touch tone phone)." Since, the customer desires to transfer funds from an existing account to another existing account, the customer presses or says 2. (Step 50). In step 81, the customer hears the login prompt requesting he authenticate himself by entering or saying his Social Security number and 6 digit pin which may include characters and numbers. If authentication is confirmed by the IVR, the customer hears the prompt "Press or say 1 for Checking Account Information. Press or say 2 for Loan Information. Press or say 3 for Savings Account Information. Press or say 4 to Transfer funds." (Step 82). As seen from FIG. 1a, there are 3 more options to choose from in step 82. However, the customer does not need to hear these options before he presses 4 on the touch tone phone or says the number 4 to transfer finds from one account to another.

Should the customer select 1 for new account information (step 40), the customer would have heard the prompt "Press or say 1 for information on Santa Claus accounts. Press or say 2 for information on Certificates of Deposit. Press or say 3 for information on opening an ABC Bank credit card. Press or say 4 for information on opening an Individual Retirement Account. Press or say 5 for rates on Certificates of Deposit. Press or Say 6 for rates on Individual Retirement Accounts." (Step 80).

If the customer selected 3 to access bank information (step 60), the customer would have heard the prompt, "Press or say 1 for Bank Hours. Press or say 2 for Holiday Hours. Press or say 3 for Directions to the Bank. Press or say 4 to Access the Employee Directory. Press or say 5 to Speak to an Operator." (Step 88).

FIG. 1C is an example of a top-level menu in a unified messaging IVR. In step 100, the customer logs into their unified messaging account using a login account and password, that can be a 4 to 8 digits and may include characters and numbers. In step 110, if the customer successfully logs into their unified messaging account, that is, the unified messaging system authenticates the customer, the IVR presents the customer the following options: "Press or say 1 to access voice mail. Press or say 2 to access email. Press or say 3 to access facsimile messages. You may press or say pound to return to this menu." If the customer wants to hear their voice mail messages, the customer presses or says 1. (Step 111). Since the customer chose to listen to voice mail messages, in step 120 the IVR presents the following prompt to the customer "You have # new voice mail messages and # saved voice mail messages." In step 123, the IVR prompts the customer to "Press or say 1 to listen to listen to new voice mail messages. Press or say 2 to listen to saved voice mail messages." Similar choices are provided when the customer accesses their email (step 112) or fax messages (step 113).

FIG. 1D is an example of a voicemail IVR. In step 130, a student dials his professor's office telephone number. In step 140, the IVR presents the following options: "Press or say 1 to hear Professor Black's office hours. Press or say 2 to speak with Professor Black. Press or say 3 to speak with my administrative assistant."

Many customers experience frustration with IVR systems that have a lengthy number of menu options, such as, those presented in FIGS. 1A, 1B and 1C or take a long time to complete a task. Due to this, many companies revise and redesign IVR menus to increase the efficiency of the IVR.

At least one known IVR may dynamically customize menus based on past options selected by the customer. This IVR presents personalized menu selections based on information about previous customer behavior from legacy systems, extracts insights about customers based on recent recorded choices and behavior, and matches available service options to recent preferences. Thus, the IVR presents personalized menu selections to sell the customer more products or services that the customer may be interested to hear about based on the customer profile. However, this IVR does not provide the customer the capability to personalize the IVR menus to suit his needs as he sees fit. The customer may not want or appreciate waiting through an interminable menu system and listening to advertisements trying to sell him additional products he no longer wants or needs.

IVR menus, however, do not provide customers the ability to customize an IVR menu to satisfy their particular needs and thereby improve their user experience, such as by instructing the IVR to store a navigation path as a shortcut to a particular type of transaction the next time the customer accesses the IVR. Alternatively, IVR menus do not allow a customer the ability to require different levels of authentication for menus or the ability to hide IVR menu options, while providing the IVR owner with ultimate control over the menu options that may be customized. After all, customer A may not want to listen to all the menu options that customer B needs to listen to since each customer may access the IVR for different reasons.

At least one company writes software to provide an ATM customer the ability to have a "Favorite Transaction" feature, where the user configures a frequently used transaction and accesses this feature at the touch of a button after PIN authentication. For example, if a customer routinely withdraws $100 and wants a receipt, the software will allow the customer to configure this option, thus reducing the customer's time at the ATM. However, such capability is typically limited to specific ATMs with the software to allow a customer to configure this option, i.e., specific local clients, and hence not via any audio interface or from a web interface.

Alternatively on many web browsers, "Favorites" lists a shortcut /URL to a favorite website. Similarly, many desktops allow the user to customize toolbars as a shortcut to different actions in desktop software. However, customization is only for a local client and not on a server based account.

SUMMARY OF THE INVENTION

These and other needs are addressed by the present invention. The present invention is directed generally to user customizable or configurable interactive voice response unit or IVR. As used herein, an IVR refers to a computational component that provides voice prompts to a user and/or converts user input in response to the voice prompts into one or more computer commands or data (e.g., effect menu and/or option selections, provide information such as names or words, etc.) For example, an IVR can capture and "understand" touchtone (DTMF) keypad input or voice responses from a user.

In one embodiment, a method for customizing an IVR is provided that includes the steps of receiving, from the user, a request to change the menu structure, effecting the requested change to the menu structure (such as by saving the change to one or more configuration files), and associating the changed menu structure with the requesting user (such as by referencing a user account or identifier with the requested changes). As will be appreciated, the menu structure includes a plurality of menus, each menu comprising a plurality of options that are selectable by a user. The plurality of menus and each menu's respective plurality of options typically define a multi-level, tree-like structure and thus a plurality of differing potential navigation paths for the user through the menu structure. Each menu and its associated options are located at a respective level in the tree-like structure. Thus, the various menus are positioned at different levels in the structure.

The user configurable IVR can provide the user with two or more of the following options:

(a) creating a new navigation path;
(b) hiding a menu option;
(c) editing a new navigation path;
(d) adding an authentication requirement to a selected menu; and
(e) deleting an authentication requirement from a selected menu.

When the requested change is the creation of new navigation path, the IVR creates a new navigation path at a location selected by the user, saves the new navigation path in a configuration file associated with the user, and records a prompt from the user to indicate the new navigation path. This typically involves saving a current position vector of the user in a file associated with the user. The user may access the new navigation path by entering a shortcut code that is associated with the path. This permits the user to shortcut parts of the original navigation path instead of having to select from every menu/option every time the user accesses the same feature.

For example, the user may access a bank's IVR system to check the balance on one or more accounts. Once the user has logged and identified himself, instead of only being able to access a set of generic menu options, the user can choose to set up a customized code which will perform an entire set of operations. So if the user must always select a set of options such as "dial 1 for phone banking", "2 for lost or stolen cards", "3 for latest award schemes", then after dialing "1", "dial 1 for statement account", "2 for passbook", "3 for credit card", then after dialing "3", "dial 1 for account balance", "2 for transaction history", etc., the user is instead offered initially to dial "6" to go straight to the account balance for the account.

When the requested change is to hide a menu and/or option, the IVR adds the menu and/or option to a set of menus and/or options to hide in a selected navigation path and saves the modified set of menus and/or options in a configuration file associated with the user. The IVR can be configured to determine whether the menu and/or option is eligible to be hidden and only perform the requested change when the menu and option may be hidden. In this way, a user can eliminate ever having to listen to menu options that they are not interested in. Rather than just recording entire paths through the IVR, users can simply prune options at each menu level so that navigation is quicker. For example, after each level of the IVR tree has been navigated the user can elect not to hear certain options the next time they use the IVR or restore all options in case they want to add some back in.

When the requested change is to add an authentication requirement associated with the menu and/or option, the IVR prompts the user to enter authentication information and prompts the user to attach a file, enter a pathname to the file, and/or record a message to play to an authenticated user. This feature permits the user to restrict certain actions to different levels of authentication. In this way, a user might make bank account withdrawals unavailable over the phone (unless a secret code is entered) but permit deposits so that debtors can access the account to make deposits to it.

When the requested change is to delete an authentication requirement associated with menu and/or an option, the IVR prompts the user to enter authentication information and only deletes the authentication requirement when the authentication information is successfully validated.

In a typical application, the menu structure is associated with a server-based account of the user. In that event, the IVR authenticates the user before permitting the user to make any changes.

The IVR is typically associated with a number of user accounts. Each user account corresponding to a unique user. Each user has a corresponding set of changes to the menu structure. The various sets of changes to the menu structure are usually different from one another.

The present invention can offer a number of advantages. For example, users no longer are required to repeatedly navigate the same path through a series of IVR menus. This ability saves the users time and avoids errors, thereby providing higher levels of customer convenience and satisfaction.

These and other advantages will become apparent in the discussion below.

BRIEF DESCRIPTION OF THE DRAWINGS

FIG. 7A is a data structure associated with the Create Shortcut mode;

FIG. 7B is a data structure associated with the Hide Item mode; and

FIG. 7C is a data structure associated with the Configure Authentication code.

DETAILED DESCRIPTION

Figure 1A:
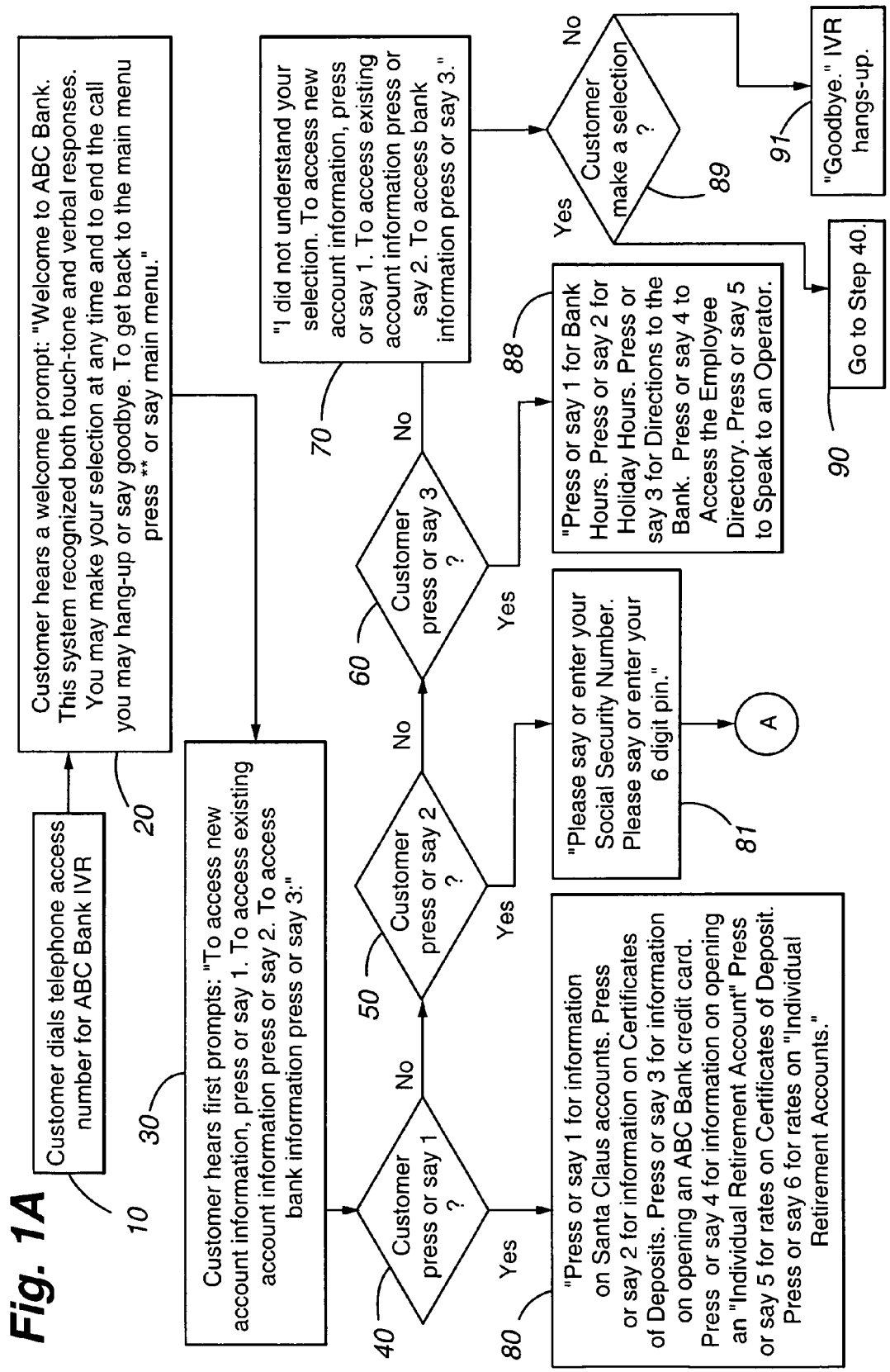
FIGS. 1A and 1B provide an example of a bank IVR including some lower-level menu options.
Figure 1B:
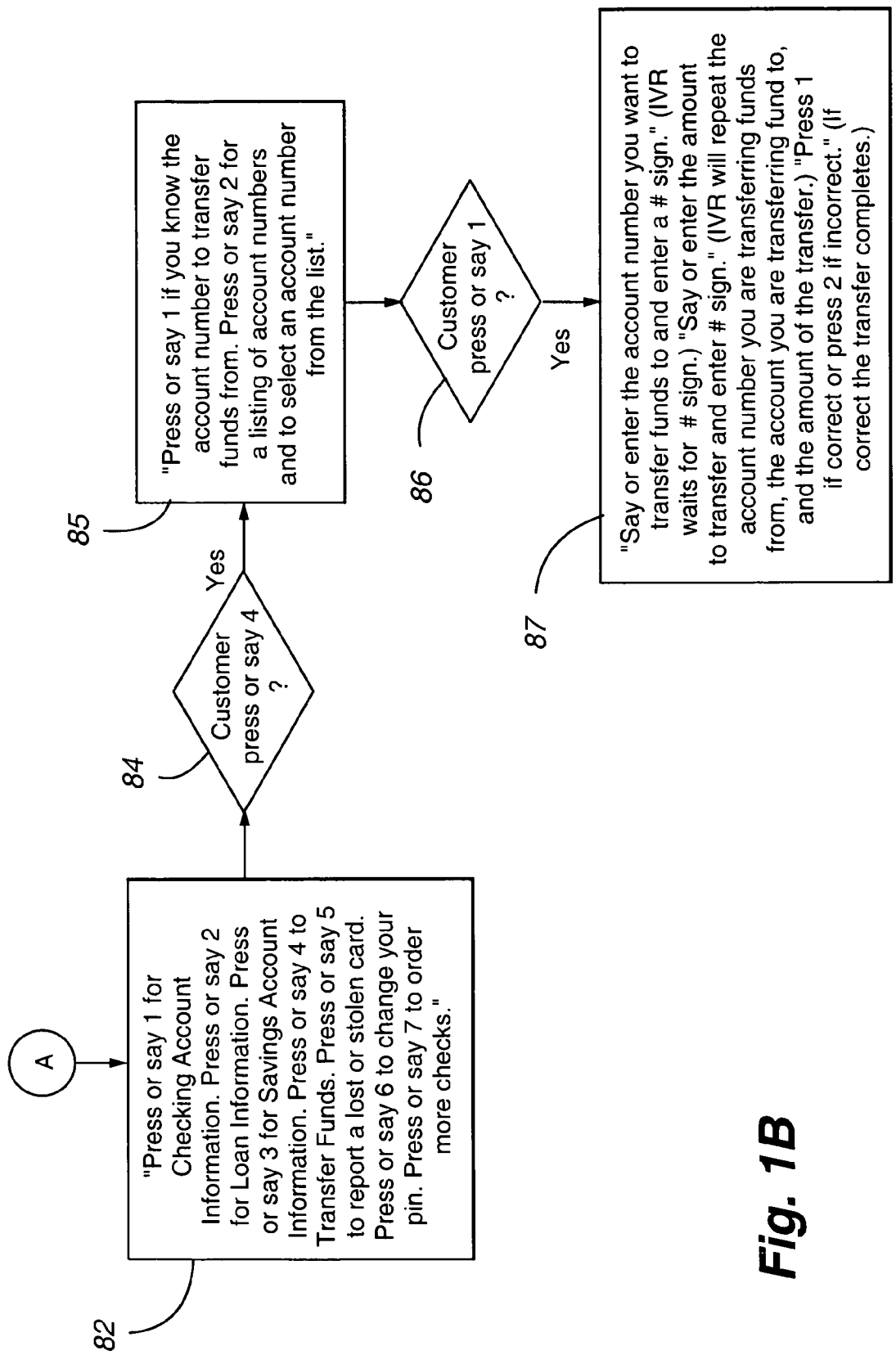
Figure 1C:
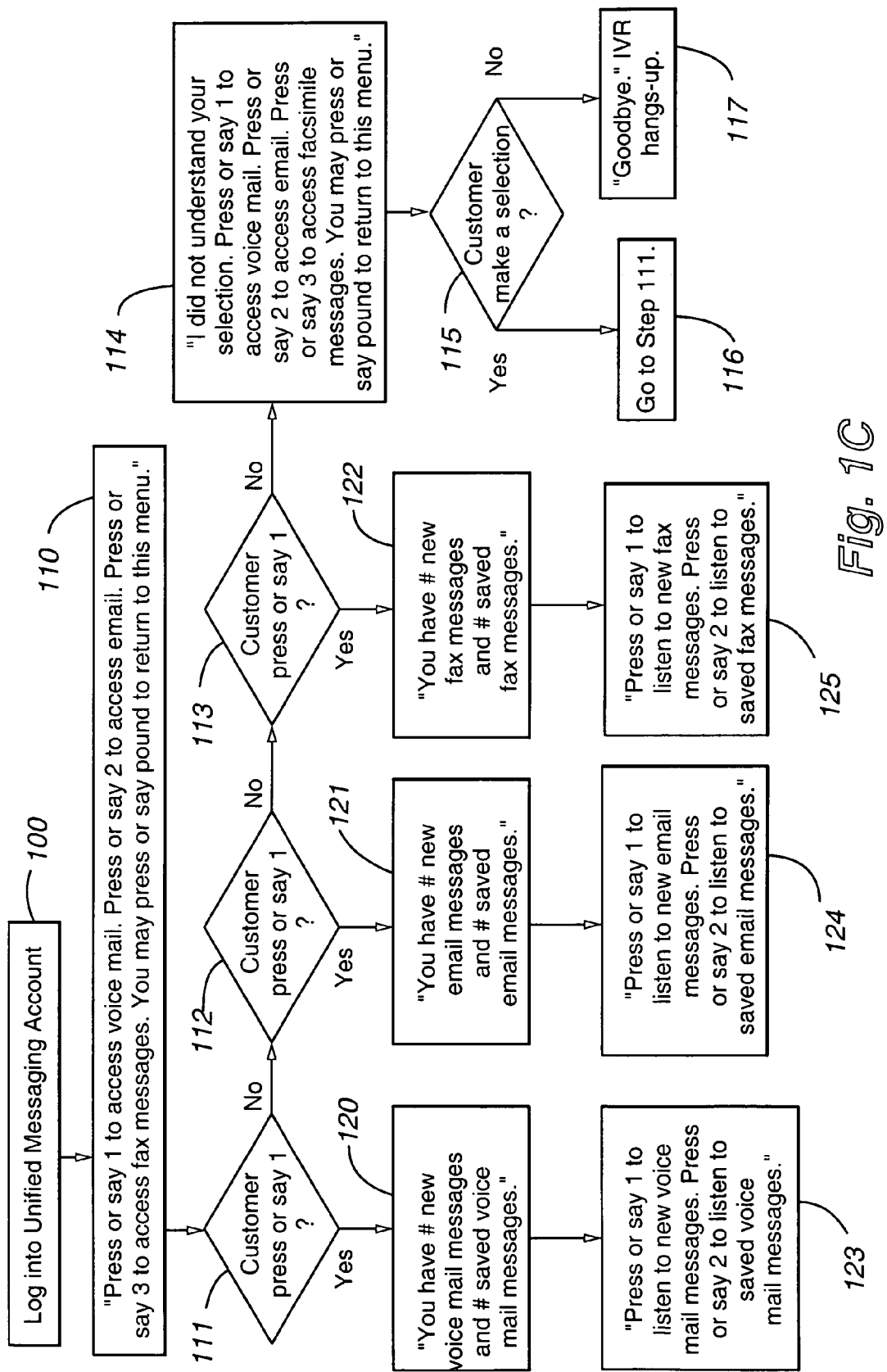
FIG. 1C is an example of top level menu options for a Unified Messaging™ IVR.
Figure 1D:
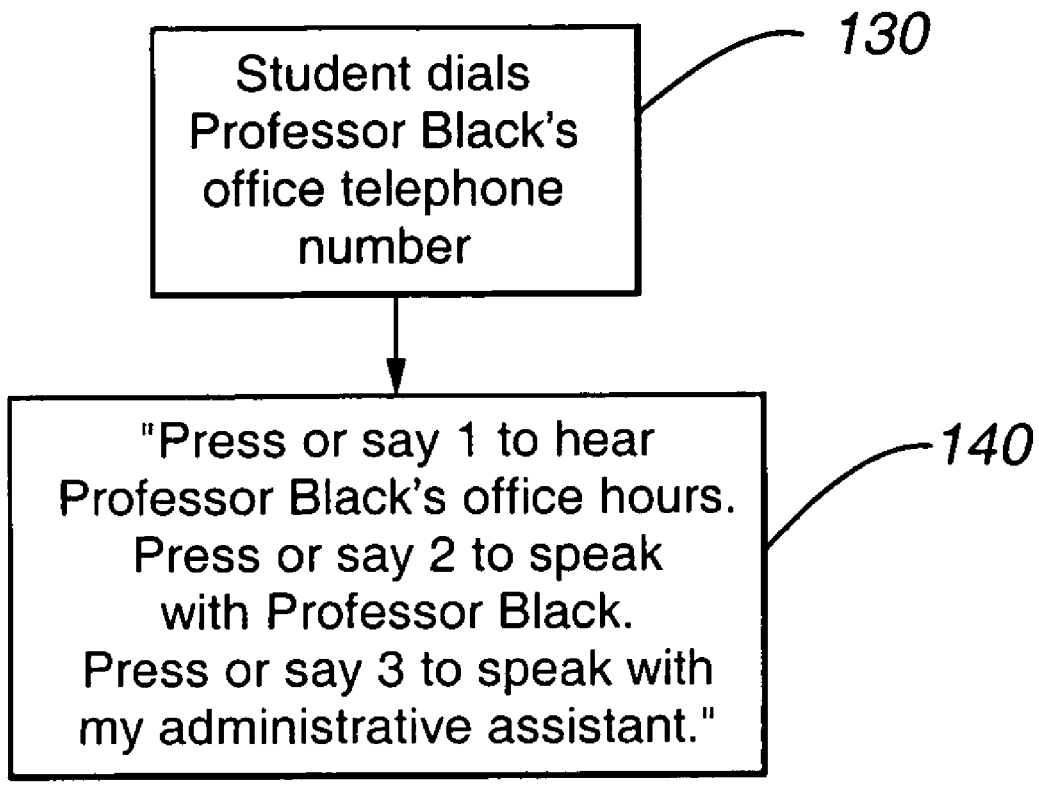
FIG. 1D is an example of an office voice mail IVR.
Figure 2A:
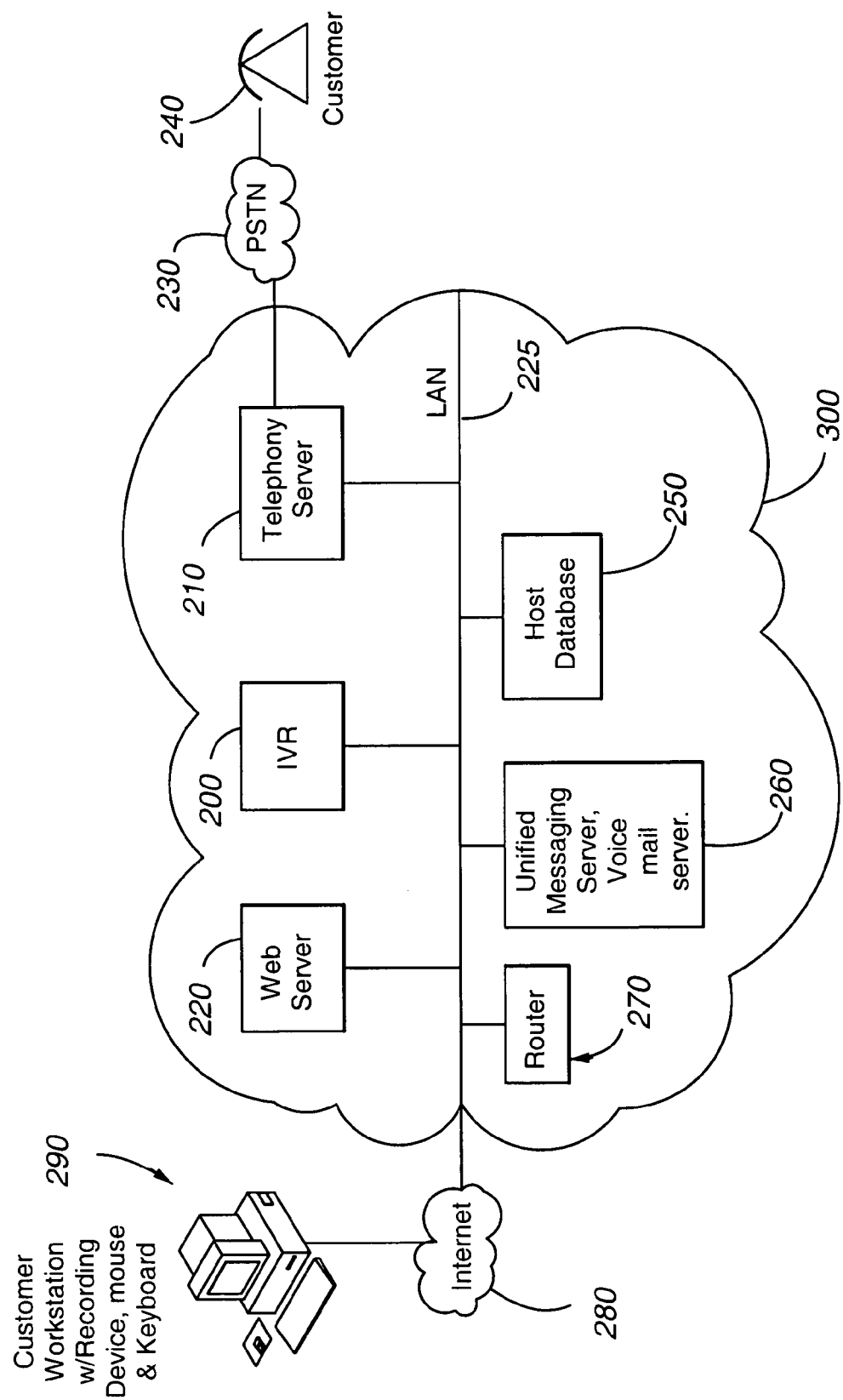
FIG. 2A is a system diagram incorporating the use of an IVR according to an embodiment of the present invention.

FIG. 2A is a system diagram incorporating use of an IVR 200 practicing the present invention. System 300 includes telecommunications equipment found in a bank, corporation, university, etc. When customer 240 is a bank customer, he places a telephone call via the public switched telephone network (PSTN) 230 to a typical bank IVR, for example, to transfer funds as shown in FIGS. 1A and 1B. If the customer's 240 telephone does not have touch tone (dual tone multi-frequency "DTMF") capability, the customer may still communicate with the IVR 200 using voice response if the IVR has speech recognition capability. When customer 240 works in a corporation, he may call internally from an office phone or externally from home or anywhere outside of the office to retrieve voice, email or fax messages via his unified messaging system 260 and IVR 200 as in FIG. 1C. When customer 240 is a university student, he may call his professor's office to speak to his professor and be presented with IVR menus as in FIG. 1D. Similarly, customer 290 may use IP softphone application software on his personal computer to allow his PC to function as a desktop IP phone or use a desktop IP telephone to place a telephone call using the Internet 280. Alternatively, customer 290 may be the professor, office worker, or bank customer desiring to use his web browser on his personal computer to customize the IVR menu options for his server account. This is possible if the IVR owner, the university, corporation, or bank allows such customization via the web browser.

System 300 includes IVR 200, telephony server 210 and additionally any of the following, if necessary, web server 220, host database 250, unified messaging or voice mail server 260, router 270 where all of these components communicate via LAN 225. The telephony server 210 manages the switching of telephone calls for internal users, such as, call center agents or employees (not shown), and answers and transfers inbound and outbound telephone calls from the PSTN 230 or Internet 280. The telephony server 210 has analog and digital port boards (not shown) to support legacy analog and digital telephones as well as an IP board to support IP desktop telephones or IP softphone application software.

The unified messaging server 260 stores voice, fax or email messages on its message store or presents one location to access voice, fax or email messages. The unified messaging server 260 has software to interface with IVR 200 and telephony server 210 to allow the internal or external customer to retrieve voice, fax, or email messages from their telephone. Alternatively, a voice mail server 260 allows the internal or external customer to retrieve only voice and fax messages from their telephone. The customer 240, 290 dials the telephone access number to the unified messaging or voice mail server 260. The telephony server 210 transfers the call to the unified messaging access number and the IVR 200 provides the customer with menu options and prerecorded digitized audio prompts such as those shown in FIG. 1C or FIG. 1D. Once the customer selects an IVR menu option, messages are provided to the customer using the resources on the telephony server 210 or those on the unified messaging or voice mail server 260. If the telephony server 210 and the unified messaging or voice mail server 260 are co-resident, then the resources on the co-resident server converts the stored digitized voice message to analog voice signals before presenting to the customer 240, 290. Similarly, resources on the unified messaging or voice mail server 260, such as, text-to-speech (TTS) converts text messages, such as, email messages to digitized audio.

For situations where large amounts of processing power are not required, the IVR 200 and unified messaging server or voice mail server 260 may be co-resident. For situations where larger amounts of processing power are required, the IVR 200 and unified messaging or voice mail server 260 may reside on separate servers.

The host database 250 stores customer account information and may be co-resident with the IVR 200 for situations where a separate database is not necessary to store small amounts of customer account information. If a separate database is necessary, reducing the number of disk accesses to the local database will improve performance.

IVR 200 provides the customer 240, 290 with menu options and prerecorded digitized audio prompts telling the customer 240, 290 to use the DTMF capability on the customer's telephone or use the IVR's 200 speech recognition capability to select a menu option or request information. The IVR 200 may use its text-to-speech (TTS) capability to provide the customer 240, 290 information stored, for example, in a file or on a web page anywhere on the Internet 280. As may be the case, for example, if a customer desires to access real time information, such as back rates or stock quotes posted on a web page.

When IVR 200 provides information from a web page, IVR 200 uses a VXML (voice extensible markup language) interpreter, which provides the functionality for parsing and processing the VXML documents that may be stored on web server 220 or anywhere on the Internet 280. The VXML interpreter enables VXML applications to perform functions such as prompting users with TTS and prerecorded digitized audio; collecting user input with speech recognition and DTMF input; recording user speech; and providing basic telephony control, such as transfer and hang-up. The IVR 200 also uses software to interface between the VXML interpreter and the IVR 200 platform software to manage the voice and data transmissions required by the VXML application. This allows the IVR 200 to provide data and telephony functions required by the VXML application, such as, prompting users with TTS and prerecorded digitized audio, collecting user input with speech recognition and DTMF input, etc.

The web server 220 may store the VXML documents, which provide the software code controlling the VXML applications. Alternatively, VXML documents may reside anywhere on the Internet as long as they are accessible by the VXML interpreter in IVR 200. Otherwise, VXML documents may reside on a local file system (not shown) or on the IVR 200.

Figure 2B:
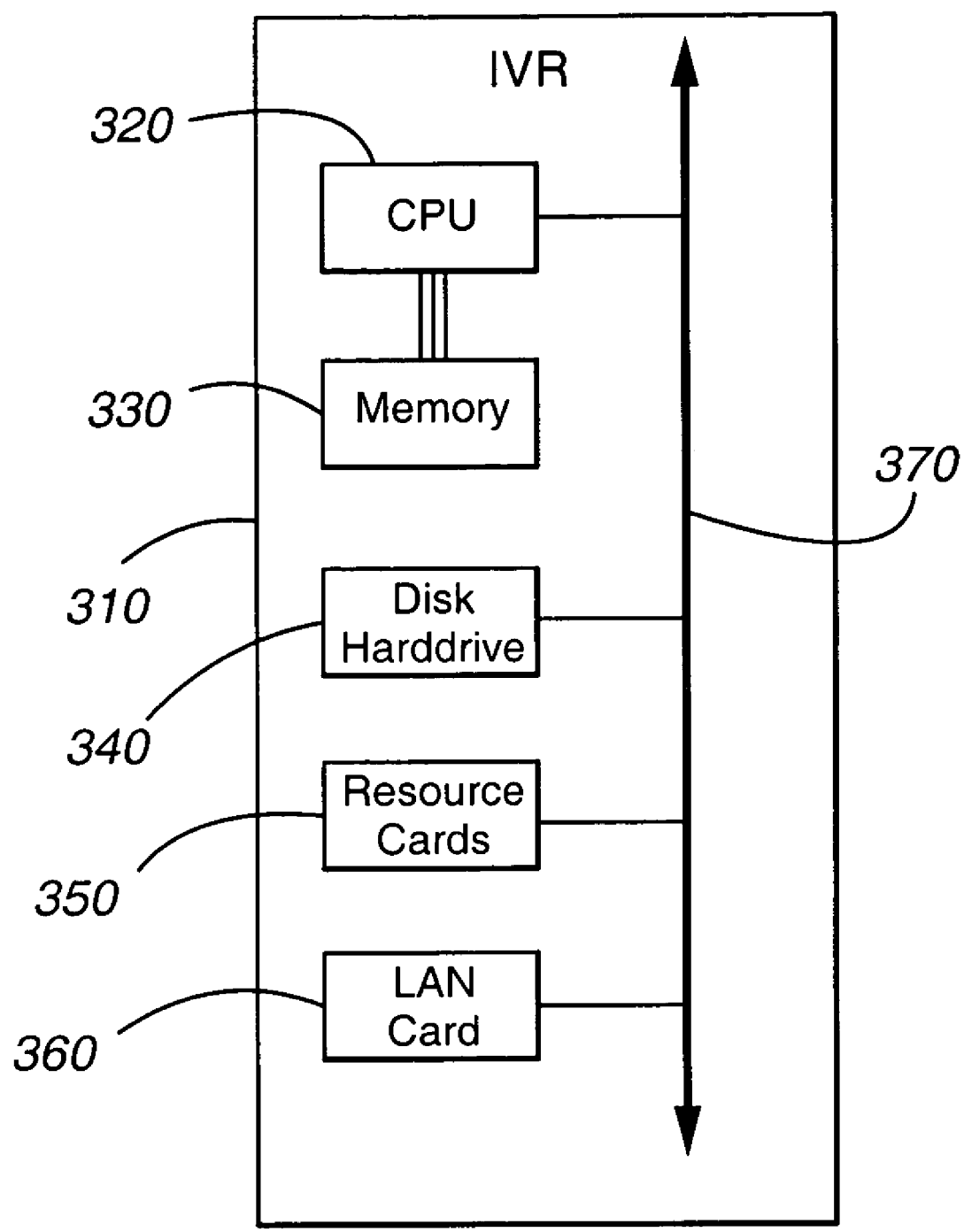
FIG. 2B is a block diagram of an IVR according to an embodiment of the present invention.

FIG. 2B is a block diagram of an IVR 310. IVR 310 includes CPU 320, memory 330, hard disk drive 340, resource cards 350 and LAN card 360, such as an Ethernet card, and bus 370 connecting the components 320-360 IVR hard disk drive 340 stores customer recorded prompts, platform software for the operation, administration and maintenance of the IVR 310 such as backup, speech administration, interface software to communicate other servers such as the unified messaging or voice mail server 260, web server 220, host database 250 and the telephony server 210, etc. The operation of the IVR also includes the additional software discussed in the following diagrams and prerecorded digital audio prompts to allow the customer to personalize the IVR menu options and navigation paths to suit his needs.

IVR 310 includes resource cards 350 to handle digit collection from dual tone multi-frequencies (DTMF) telephones and automatic speech recognition (ASR) resources to understand customer responses when the customer chooses to speak their responses, voice processing resources to record customer's prompts, and basic telephony control such as transfer, hanging-up and answering the telephone call. Additionally, the IVR includes text-to-speech (TTS) resources to convert text in a file or on a web page into digitized audio. Of course, additional voice processing, DTMF, TTS and ASR resources may reside on another server, if necessary due to processing needs.

In the preferred embodiment, the customer may use an audio interface to respond to prerecorded digitized audio prompts either using the telephone touch tones or speech recognition. Additionally, the customer may use a visual interface, such as web browser, to personalize the IVR to suit his needs. The IVR owner may allow the customer to log into his server account via the Internet and provide the customer a link to an HTML page that allows the customer to personalize the same menus the customer may personalize via the audio interface. The IVR owner still retains control over the menus the customer may personalize while providing an additional value added service. As for any additional prompts that need recording, the customer may enter the text on-line and allow the IVR 310 TTS capability to convert the text to speech. Alternatively, the customer may have a recording device such as a microphone at his personal computer ("PC") or workstation to record a prompt, for example, as a .WAV file that is downloaded and stored in the IVR hard disk drive 340.

When the customer is using an audio or web interface to customize the IVR 310, the following suggestions to improve system performance are applicable. The IVR 310 may consider suggesting to limit the length of time the customer uses to record a particular prompt.

Figure 3:
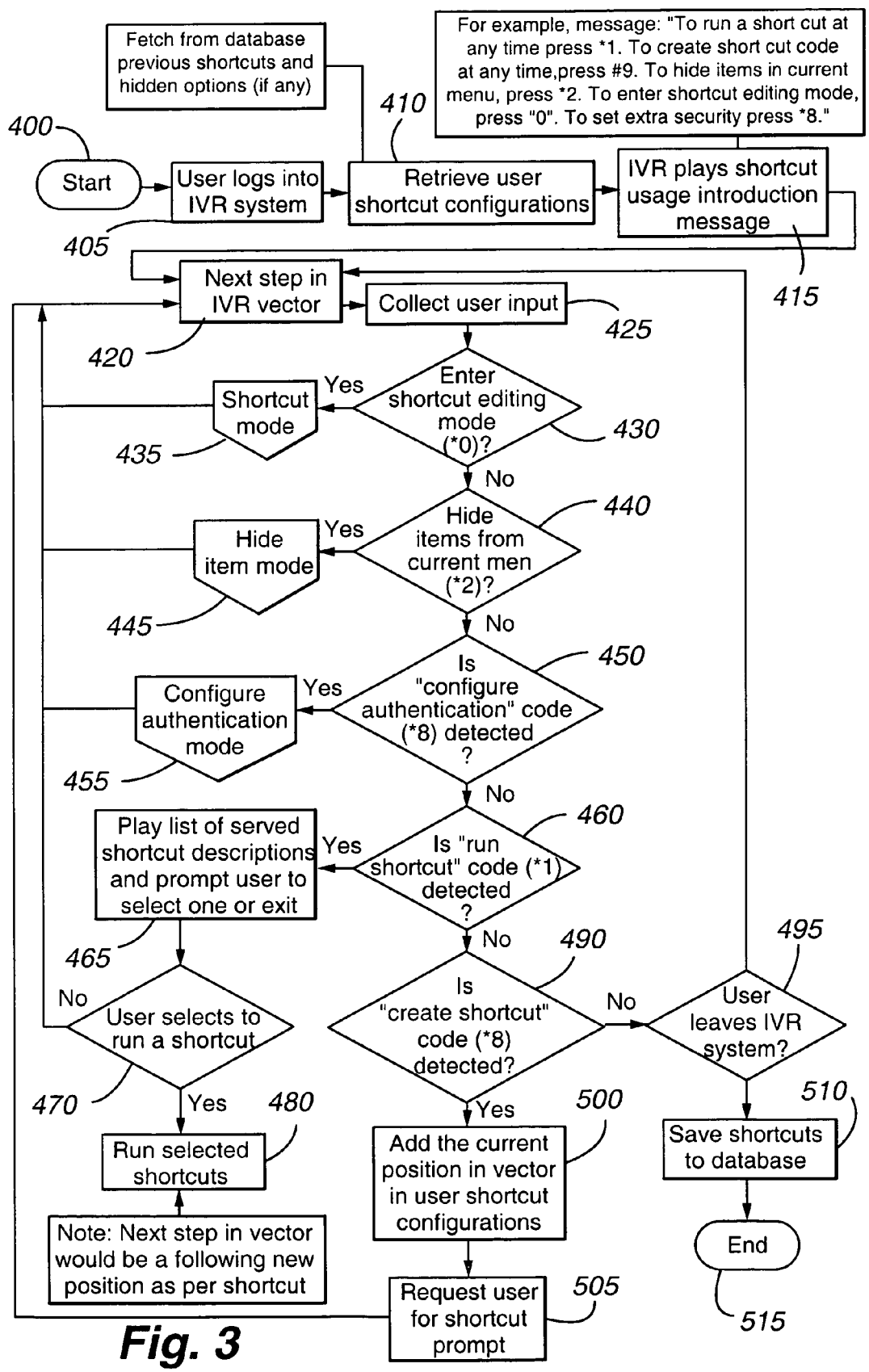
FIG. 3 is a flow chart depicting an embodiment of the present invention.

FIG. 3 incorporates the novel features of the present system and method to customize an IVR, such as the shortcut edit mode, run shortcut code, create shortcut code, hide item from current menu mode, and configure authentication code. Create shortcut mode is useful to bypass navigation paths as desired. Create shortcut mode allows the customer to edit the IVR navigation path by creating a new navigation path at the desired location, saving the new navigation path and recording a prompt to indicate the new shortcut. In create shortcut mode (enter *9 using telephone keypad or say *9), the IVR adds the current position in the IVR vector, i.e., navigation path to the customer's or internal user's shortcut configuration file. The IVR requests the customer or internal user to record a prompt for the new shortcut. In run shortcut code (enter * 1 using telephone keypad or say * 1), the entries in the shortcut configuration file are executed. In shortcut edit mode (enter *0 using the telephone keypad or say *0), the customer or internal user is played the list of current shortcuts and prompted to delete a shortcut or change any of the previously recorded shortcut prompts.

In hide item mode, (enter *2 using the telephone keypad or say *2), the IVR allows the customer to hide menu options so that navigation through the menu is quicker. Note the IVR owner may decide not to allow the customer to hide a particular menu option. For example, the IVR owner certainly would not want the customer to hide the menu items requesting the customer or internal user to enter a PIN or password at the very beginning of the IVR menu to access a server based account. There is an example of this mode provided in FIG. 5.

In configuring authentication code (enter *8 using the telephone keypad or say *8), the IVR allows the customer to add an authentication requirement to any menu level or delete a previously configured authentication requirement. This is especially useful in many situations. For example, a manager allows his administrative assistant to log into his unified messaging account and retrieve the number of new voice, email, and fax messages. The administrative assistant reports the numbers to him before he begins his work day. The manager, however, does not want his administrative assistant to listen, save, forward, delete or reply to his new or saved messages. The manager can add a level of authentication to prevent the administrative assistant from doing anything but retrieving the number of new voice, email, and fax messages. There is an example provided in FIG. 6.

Returning to FIG. 3, step 400, the customer or internal user dials the appropriate telephone number to access the IVR menu. In step 405, the customer or internal user enters the appropriate authentication information to log into their server based account. In step 410, the IVR retrieves from the hard disk drive 340 or the host database 250, previous shortcuts, hidden options or levels of authentication previously configured by the customer or internal user. In step 415, the IVR plays an instructional message such as "To run a shortcut at anytime, press *1. To create a shortcut code at any time, press *9. To hide items in current menu, press *2. To enter shortcut editing mode, press *0. To set extra security levels press *8." At step 420, the IVR proceeds to the next step in the IVR vector, or navigation path.

Figure 4:
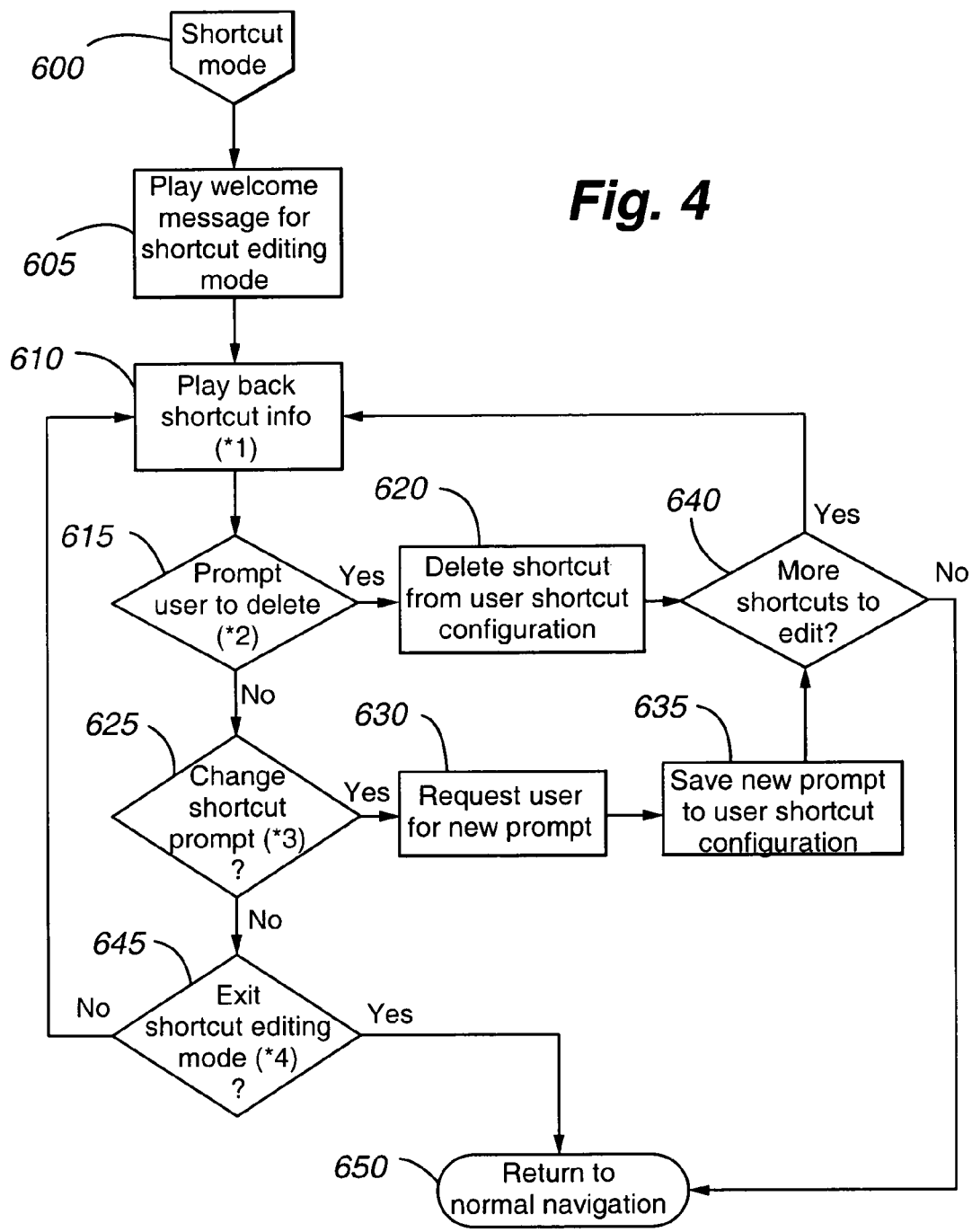
FIG. 4 is a flow chart depicting the shortcut editing mode according to an embodiment of the present invention.
Figure 5:
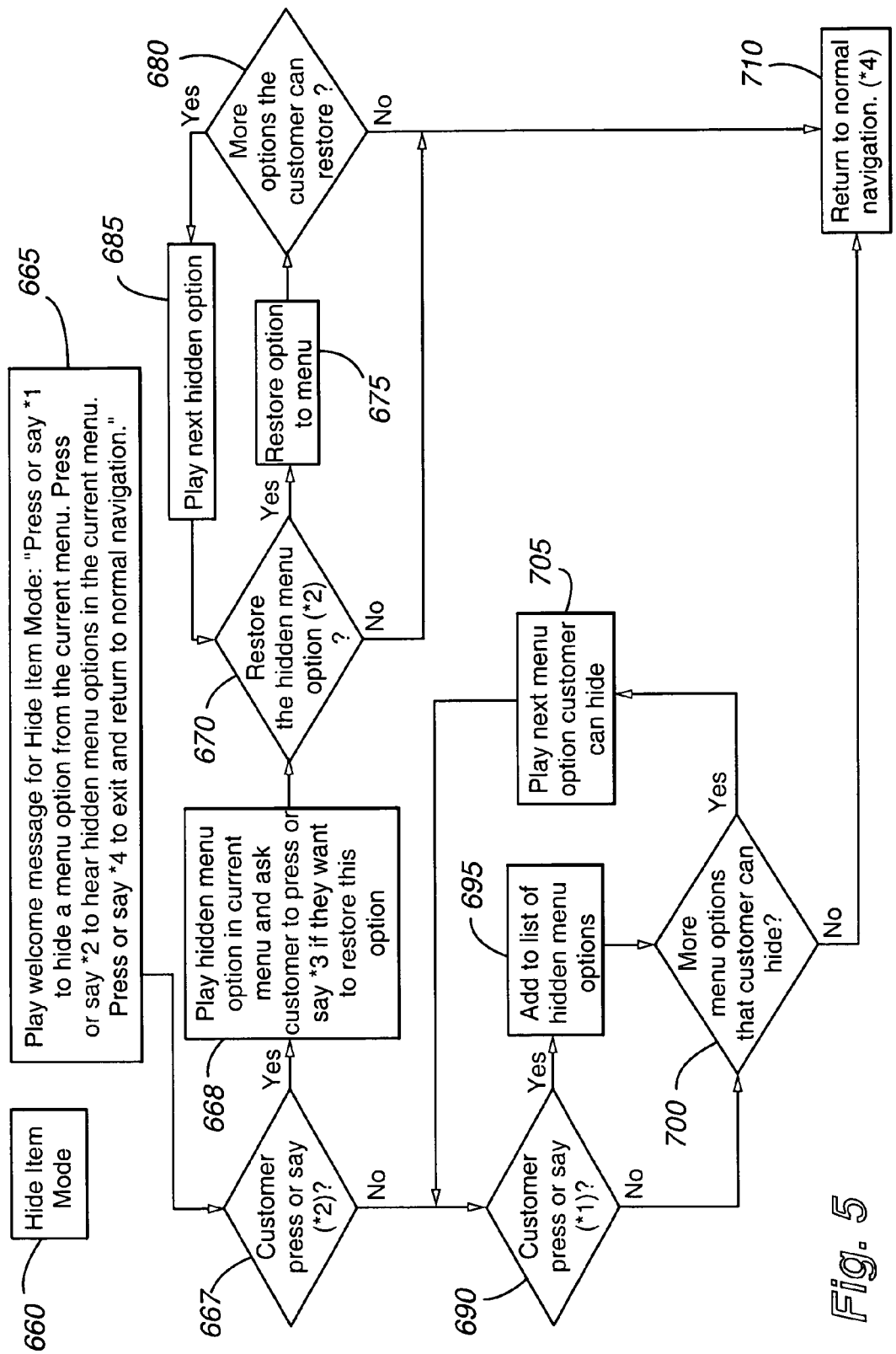
FIG. 5 is a flow chart depicting the hide item mode according to an embodiment of the present invention.
Figure 6:
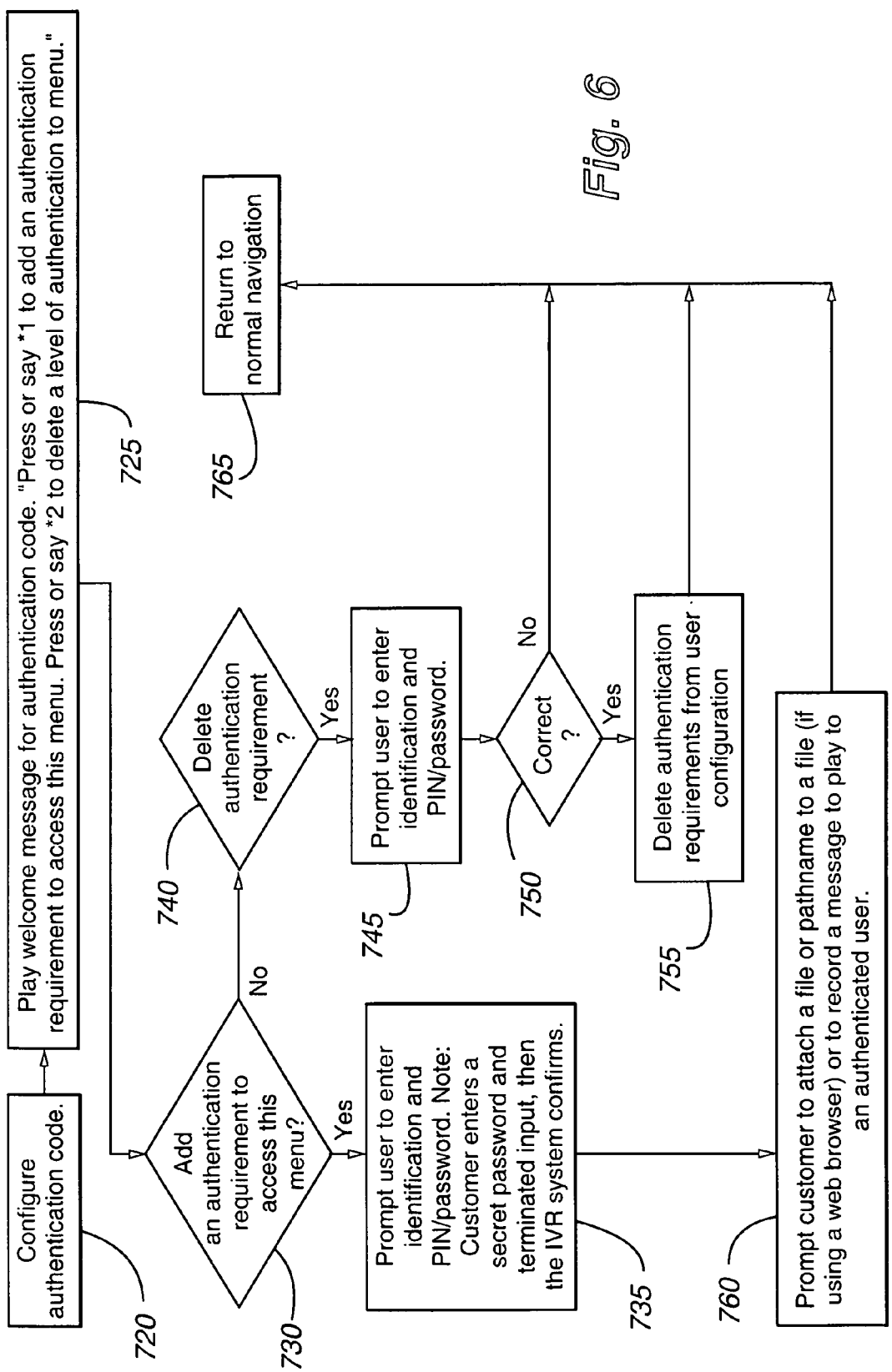
FIG. 6 is a flow chart depicting the configure authentication code according to an embodiment of the present invention.

At step 425, the IVR collects an input from the customer or internal user. If the customer or user entered *0 to enter the shortcut editing mode, the next step in the IVR is step 435. FIG. 4 shows the steps involved to edit the shortcut including deleting the configured shortcut or changing the previously recorded shortcut prompt. If the customer or user entered *2 to hide items from the current menu (step 440), the next step in the IVR is step 445. FIG. 5 shows the steps involved to hide an item, hear menu options already hidden and restore any hidden menu options. If the customer or user entered *8 (step 450) to enter the configure authentication code, the next step in the IVR is step 455. FIG. 6 shows the steps involved to add a level of authentication to a menu or to delete a level of authentication to a menu. If the customer or internal user entered *1 (step 460) to run shortcut code, the next step in the IVR is step 465. In step 465, the IVR plays the list of saved shortcut descriptions and prompts the user to select one or exit. If the customer or internal user selects to run a shortcut (step 470), then this shortcut is saved in the IVR user configuration file (step 480). If the customer or internal user chooses not to run a shortcut (step 470), the IVR goes back to step 420 which is the next step in the IVR vector, i.e., navigation path. If the customer or internal user entered *9 (step 490) to create a shortcut, the next step in the IVR is step 500. In step 500, the current position in IVR vector is temporarily saved in the user shortcut configurations. It does not get saved in the user configuration file until *1 is entered to run the shortcut code. In step 505, the customer or internal user is requested to record a shortcut prompt that describes this shortcut. After recording the shortcut prompt, the customer or user goes back to step 420, which is the next step in the IVR vector. If the IVR has not collected any input either via touch tones or verbally, in step 495 the IVR determines whether the customer or internal user has left the IVR by hanging up. If the customer has hung up, then at step 510 the IVR saves changes to the hard disk drive 340 or host database 250. If the customer or internal user did not hang up in step 495, the IVR proceeds to the next step in the IVR vector, step 420.

The following is an example of how a customer creates a shortcut. As would be the case if a customer does not trust performing money transfers from one bank account to another online but prefers to perform this type of transaction using an audio interface, such as, the telephone. Rather than have to wait through an interminable number of generic menu options as in FIGS. 1A and B, the customer can create a shortcut option that will perform an entire set of operations. After authenticating himself, for example, by entering his social security and a 6-digit pin, the customer creates and saves a shortcut navigation path to transfer money. As a result of creating this shortcut, the customer will hear this shortcut as part of the top-level options available to the customer the next time the customer accesses his server based account. This example is based on FIGS. 1A, 1B and 3. Steps 1-8, show the shortcut creation and steps 9-11 runs the shortcut thereby saving it to the user configuration file:

1. Customer performs steps 10-30. Customer desires to transfer funds between existing accounts and hence presses or says 2. (FIG. 1A, step 50). The customer authenticates himself by entering or saying his Social Security number and 6-digit pin. (FIG. 1a, step 81; FIG. 3, step 405).

2. IVR retrieves customer's shortcut configurations, if any, from host database or IVR hard disk drive. (FIG. 3, step 410).

3. IVR plays shortcut usage instruction prompt- "To run a short cut at any time press or say * 1. To create shortcut code at any time, press or say *9. To hide items in current menu, press or say *2. To enter shortcut editing mode, press or say *0. To set extra security press *8." (FIG. 3, step 415).

4. Customer hears the prompt "Press or say 1 for checking account information. Press or say 2 for loan information. Press or say 3 for savings account information. Press or say 4 to transfer funds." (FIG. 1A, step 82. Note there are other options after press or say 4 to transfer finds but the customer does not have to wait to hear these since he wants to transfer funds.)

5. Customer presses or says 4 to transfer funds. (FIG. 11B, step 84).

6. Customer presses or says *9 which adds current position in IVR vector to the user's shortcut configuration. (FIG. 3, steps 490 and 500).

7. IVR requests user to record an appropriate shortcut prompt. (FIG. 3, step 505). In this case, the customer records the phrase "Skip to transfer funds." Note:

The IVR will decide which actual digit the user will need to select to access the shortcut. This provides the customer the benefit of not having to worry about which digit to select and avoids conflicts resulting from the selection of inconsistent digits (e.g., same digit is entered twice for the two different options). The IVR will say "Press or say <option number>to" then insert the user recorded prompt.

8. The IVR goes back to next step in IVR vector (FIG. 3, step 420) which is "Press or say 1 if you know the account number you want to transfer funds from, Press or say 2 for a listing of account numbers and select an account number from the list." (FIG. 1A, step 85.)

9. Customer enters * 1 to run shortcut code detect. (FIG. 3, step 460).

10. The IVR plays the list of saved shortcode prompts and prompts the customer to select one or exit. In this case, the IVR plays "Press or say <option number selected by IVR>to skip to transfer funds. Make a selection or exit by pressing or saying **." (FIG. 3, step 465)

11. Customer selects shortcut by pressing or saying <option number>. (FIG. 3, step 470 and 480). This saves the shortcut in the customer's configuration file. Then, the IVR proceeds to the next step in the IVR vector (FIG. 3, step 420).

The next time the customer desires to transfer money from one ABC bank account to another ABC bank account these are the menus he will encounter:

1. Customer performs steps 10-30 in FIG. 1A. Customer presses or says 2. (FIG. 1A, step 50). In step 81, the customer authenticates himself by entering or saying Social Security number and 6 digit pin.

2. IVR retrieves customer's configuration file, which includes shortcuts, hidden options and levels of authentication from host database. (FIG. 3, step 410).

3. IVR plays shortcut usage instruction prompt—"To run a short cut at any time press or say * 1. To create shortcut code at any time, press or say *9. To hide items in current menu, press or say *2. To enter shortcut editing mode, press or say *0. To set extra security press *8." (FIG. 3, step 415).

4. Customer hears the prompt "Press or say <option number>to skip to transfer funds." Note the customer does not have to wait for the rest of the prompts in step 82 to be spoken before making a selection.

5. The customer presses or says <option number>to skip to transfer funds.

6. The customer proceeds to step 85, "Press or say 1 if you know the account number you want to transfer funds from. Press or say 2 for a listing of account numbers and select an account number from the list." All menu options following this menu remain unchanged.

FIG. 4 shows the steps involved in the shortcut editing mode. To enter this mode, the customer enters *0 to edit shortcuts (FIG. 3, step 430), that is, to delete a shortcut or change a shortcut prompt. In FIG. 4 step 600, the customer enters shortcut editing mode. In step 605, the customer hears the prompt: "To hear a list of shortcut prompts, press or say *1. To exit shortcut editing mode, press or say *4." If the customer enters or says *1, then in step 610, the customer hears a first shortcut prompt and the following: "To delete a shortcut prompt, press or say *2. To change a shortcut prompt press or say *3." If the customer enters or says *2, in step 620 this first shortcut prompt is deleted from the user shortcut configuration file. If the customer enters or says *3, in step 625 the customer is requested to record a new prompt in step 630 and in step 635 the new prompt is saved in the user shortcut configuration. In step 640, the IVR determines whether there are more shortcuts to edit. If there are more shortcuts to edit, then the IVR proceeds to step 610, otherwise the IVR proceeds to step 650, which returns the customer back to normal navigation, for example, back to the ABC Bank IVR menu.

Using the previous example in FIGS. 1A, 1B and 3, the following shows how a customer may record a new shortcut prompt perhaps because he did not like the sound recording of the previous prompt:

1. Continuing from the previous example, the customer presses or says *0 to enter the shortcut editing mode. (FIG. 3, step 430).

2. The IVR plays the welcome message for the shortcut editing mode: "To hear the list of shortcut prompts, press or say *1. To exit shortcut editing mode, press or say *4." (FIG. 4, step 605).

3. The customer presses or says *1 to hear the first shortcut prompt. The IVR also prompts the user to either delete or change the shortcut prompt: "To delete the shortcut prompt, press or say *2. To change the shortcut prompt press or say *3. (FIG. 4, step 610).

4. As the customer wants to change the prompt and record another prompt, the customer presses or says *3. (FIG. 4, step 625). The IVR prompts the user to record a new prompt. (FIG. 4, step 630). In a louder more assertive voice, the customer records "Skip to transfer funds." This new recording is saved to the user shortcut configuration file. (FIG. 4, step 635).

5. Customer presses *4 (FIG. 4 step 645) to exit the shortcut editing mode and return to normal navigation (FIG. 4 step 650), the next step in IVR vector. For example, the next step in the ABC Bank IVR menu. (FIG. 3, step 420).

FIG. 5 shows the steps involved in the hiding item from current menu mode. To enter this mode, the customer enters *2 (FIG. 3, step 440) to hide current menu options, hear hidden menu options or to restore hidden menu options. In FIG. 5 step 660, the customer enters the hide item mode. In step 665, the IVR plays the following prompt: "Press or say *1 to hide a menu option from the current menu. Press or say *2 to hear hidden menu options in current menu. Press or say *4 to exit and return to normal navigation." If customer enters or says *2 (step 667), in step 668 the customer hears a first hidden menu option. In step 668, the customer is also prompted to determine whether the customer wants to restore the hidden menu option just heard. If the customer enters or says *3 (step 670), the IVR will restore the hidden menu option just heard (step 675). The IVR determines whether there are other hidden menu options in the current menu in step 680. If there are, in step 685, the IVR plays the next hidden menu option. The customer is prompted in step 670 to enter or say *3 to restore this hidden menu option just heard. If the customer does not want to restore a hidden menu option in step 670, or there are no more hidden menu options the user can restore, the IVR returns to normal navigation in step 710.

If the customer had entered or said *1 (step 690) after hearing the prompt in step 665, the IVR plays the current menu option and prompts the customer to press or say *1 to hide this menu option, otherwise the customer should press or say ** to skip to the next menu option. If the customer enters or says * 1, the menu option just heard is added to the list of hidden menu options in step 695. The IVR determines whether there are more menu options in the current menu the customer can hide in step 700. If there are more menu options the IVR owner will allow the customer to hide, the IVR plays the next menu option the customer can hide in step 705. If there are no more menu options the customer may hide in the current menu, the IVR returns to normal navigation in step 710.

Using the previous example in FIGS. 1A, 1B and 3, the following shows how a customer may hide menu options to speed his navigation through the ABC Bank IVR:

1. After the customer selects the newly created shortcut to skip to transfer funds, then the customer will hear the following two options at the next menu level of the navigation path: "Press or say 1 if you know the account number you want to transfer funds from. Press or say 2 for a listing of account numbers and to select an account number from the list." (FIG. 1B, step 85).

2. Since the customer knows the account number he wants to transfer funds from, the customer wants to hide the second menu option which provides the listing of account numbers. To do so, the customer presses or says *2 to enter the hide item mode. (FIG. 3, step 440, 445).

3. The IVR plays the following welcome message for the hide item mode: "Press or say *1 to hide a menu option from the current menu. Press or say *2 to hear hidden menu options in current menu. Press or say *4 to exit and return to normal navigation." (FIG. 5, step 665)

4. The customer enters or says *1. (FIG. 5, step 690).

5. The IVR plays the menu options the customer can hide: "Press or say 1 if you know the account number you want to transfer funds from. Press or say *1 if you want to hide this menu option. Press or say ** to skip to next menu option."

6. The customer presses or says ** to skip to next menu option and the IVR determines there are more menu options the customer can hide. (FIG. 5, step 700). The IVR plays the next menu option the customer can hide (FIG. 5, step 705): "Press or say 2 for a listing of account numbers and to select an account number from the list." The customer presses or says *1 to hide this menu option. The IVR adds this menu option to the list of hidden options.

7. There are no more options to hide. (FIG. 5, step 700). The customer exits the hide item mode (FIG. 5, step 710) and returns to the next step in the IVR vector, i.e., the next location in the navigation path.

FIG. 6 shows the steps involved to configure levels of authentication code. To enter this mode, the customer enters *8 (FIG. 3, step 450) to add additional levels of authentication to a menu. In FIG. 6 step 720, the customer enters configure authentication code. In step 725, the IVR plays "Press or say *1 to add an authentication requirement to access this menu. Press or say *2 to delete a level of authentication to menu." If the customer enters or says *1 (step 730), the IVR prompts the user to enter an identification and PIN/password in step 735. In step 760, the IVR prompts the customer to attach a file or enter a pathname to the file (if using a web browser to perform the menu customization) or to record a message to play to an authenticated user. The IVR returns to normal navigation in step 765.

If the customer enters or says *2 after hearing the prompt in step 725, the IVR detects this in step 740 and prompts the customer to enter the identification and PIN/password in step 745. This ensures the customer is the person deleting the authentication requirement. If the IVR validates the identification and PIN/password in step 750, the authentication requirement is deleted from the user configuration in step 755 and the IVR returns to normal navigation in step 765. If the IVR does not validate the identification and PIN/password in step 750, the IVR returns to normal navigation in step 765.

The top-level menus of an unified messaging IVR in FIGS. 1C, 3, and 6 shows how a customer may add levels of authentication to a menu. For example, a manager may prevent his administrative assistant from doing anything but retrieving the number of his new voice, email, and fax messages by adding levels of authentication to the unified messaging IVR in FIG. 1C in the following manner:

1. Manager dials the telephone access number to log into his unified messaging account and authenticates himself by entering his account number and 4-digit pin. (FIG. 1C, step 100; FIG. 3, step 405).

2. IVR retrieves the manager's shortcuts, hidden options, and authentication levels if any, from the host database or IVR hard disk drive. (FIG. 3, step 410).

3. IVR plays shortcut usage instruction prompt: "To run a short cut at any time press or say *1. To create shortcut code at any time, press or say *9. To hide items in current menu, press or say *2. To enter shortcut editing mode, press or say *0. To set extra security press or say *8." (FIG. 3, step 415).

4. The IVR plays the prompt: "Press or say 1 to access voice mail. Press or say 2 to access email. Press or say 3 to access fax messages. You may press or say # to return to this menu." (FIG. 1C, step 110).

5. The manager presses or says 1 to access voice mail. (FIG. 1C, step 111). The IVR plays the following prompt: "You have # new voice mail messages and # saved voice mail messages." (FIG. 1C, step 120). The manager wants to allow his administrative assistant to log into his unified messaging account and provide him the number of new and saved voice mail messages.

6. The manager presses or says *8 to enter the configure authentication code. (FIG. 3, step 450). The manager does not want to allow his administrative assistant the ability to listen to any of his new or saved voice mail messages.

7. The IVR enters configure authentication code. (FIG. 6, step 720). The IVR plays the welcome message for the configure authentication code: "Press or say *1 to add an authentication requirement to access this menu. Press or say *2 to delete a level of authentication to this menu." (FIG. 6, step 725).

8. The manager presses *1 to add an authentication requirement to this level of the menu. (FIG. 6, step 730). The IVR prompts the manager to enter one or more identification and PIN/password and the IVR system repeats the identification and PIN/password after the numbers are entered to confirm the entry. (FIG. 6, step 735). The manager enters a new identification and password that his administrative assistant does not know.

9. The IVR prompts the manager to record a message or attach a file or pathname of a file (if using a web browser to customize the IVR) the content of which is spoken to the authenticated user. (FIG. 6, step 760). The manager does neither.

10. After a timeout since the manager did not enter information in step 760, the IVR returns to normal navigation. (FIG. 6, step 765).

11. The manager presses # to return to the main menu. (FIG. 1C, step 110).

The IVR plays: "Press or say 1 to listen to voice mail. Press or say 2 to listen to email. Press or say 3 to access fax messages. Press or say # to return to this menu." (FIG. 1C, step 110).

12. The manager presses or says 2 to listen to email. (FIG. 1C, step 112). The IVR plays the following prompt: "You have # new email messages and # saved email messages." (FIG. 1C, step 121). The manager wants to allow his administrative assistant to log into his unified messaging account and provide him the number of new and saved email messages.

13. The manager presses or says *8 to enter configure authentication code. (FIG. 3, step 450). The manager does not want to allow his administrative assistant the ability to listen to any of his new or saved email messages.

14. The IVR enters configure authentication code. (FIG. 6, step 720). The IVR plays the welcome message for the configure authentication code: "Press or say *1 to add an authentication requirement to access this menu. Press or say *2 to delete a level of authentication to this menu." (FIG. 6, step 725).

15. The manager presses *1 to add an authentication requirement to this level of the menu. (FIG. 6, step 730). The IVR prompts the manager to enter one or more identification and PIN/password and the IVR system repeats the identification and PIN/password after the numbers are entered to confirm the entry. (FIG. 6, step 735). The manager enters the same identification and password as previously entered. (FIG. 6, step 735).

16. The IVR prompts the manager to record a message or attach a file or pathname of a file (if using a web browser) the contents of which are spoken to the authenticated user. (FIG. 6, step 760). The manager does neither.

17. After a timeout since the manager did not enter information in step 760, the IVR returns to normal navigation. (FIG. 6, step 765).

18. The manager presses # to return to the main menu. (FIG. 1c, step 110).

The IVR plays: "Press or say 1 to listen to voice mail. Press or say 2 to listen to email. Press or say 3 to access fax messages. Press or say # to return to this menu." (FIG. 1C, step 110).

19. The manager presses or says 3 to access fax messages. (FIG. 1C step 113). The IVR plays the prompt: "You have # new fax messages and # saved fax messages." (FIG. 1C, step 122). The manager wants to allow his administrative assistant to log into his unified messaging account and provide him the number of new and saved fax messages.

20. The manager presses or says *8 to enter the configure authentication code. (FIG. 3, step 450). The manager does not want to allow his administrative assistant the ability to listen to any of his new or saved fax messages.

21. The IVR enters configure authentication code. (FIG. 6, step 720). The IVR plays the welcome message for the configure authentication code: "Press or say *1 to add an authentication requirement to access this menu. Press or say *2 to delete a level of authentication to this menu." (FIG. 6, step 725).

22. The manager presses *1 to add an authentication requirement to this level of the menu. (FIG. 6, step 730). The IVR prompts the manager to enter one or more identification and PIN/password and the IVR system repeats the identification and PIN/password after the numbers are entered to confirm the entry. (FIG. 6, step 735). The manager enters the same identification and password previously entered that his administrative assistant does not know. (FIG. 6, step 735).

23. The IVR prompts the manager to record a message or attach a file or pathname of a file (if using a web browser) the contents of which are spoken to the authenticated user. (FIG. 6, step 760). The manager does neither.

24. After a timeout since the manager did not enter information in step 760, the IVR returns to normal navigation. (FIG. 6, step 765).

25. Now the manager hangs up to exit the unified messaging account. The IVR saves changes to database. (FIG. 3, step 495, 510).

When administrative assistant logs into her manager's unified messaging account to retrieve voice mail messages:

1. Administrative assistant dials the telephone access number to her manager's unified messaging account and authenticates herself by entering his account number and 4-digit pin. (FIG. 1C, step 100; FIG. 3, step 405).

2. IVR retrieves customer's shortcuts, hidden options and levels of authentication, if any, from host database or IVR hard disk drive. (FIG. 3, step 410).

3. IVR plays shortcut usage instruction prompt: "To run a short cut at any time press or say *1. To create shortcut code at any time, press or say *9. To hide items in current menu, press or say *2. To enter shortcut editing mode, press or say *0. To set extra security press or say *8." (FIG. 3, step 415).

4. Administrative assistant hears the prompt: "Press or say 1 to access voice mail. Press or say 2 to access email. Press or say 3 to access fax messages. Press or say # to return to this menu." (FIG. 1C, step 110).

5. Administrative assistant presses or says 1 to access voice mail. The IVR plays the following prompt "You have # new voice mail messages and # saved voice mail messages." (FIG. 1C, step 120).

6. Next, the IVR plays "Enter an identification and PIN or password." Which prevents the administrative assistant from listening to the voice mail messages.

6. The administrative assistant may press or say # to return to the main menu. (FIG. 1C, step 110).

The administrative assistant cannot delete the authentication requirement. The configure authentication code (FIG. 6, step 720) will not allow a user to delete an authentication requirement without first entering the identification and PIN/password correctly. (FIG. 6, step 745). If the identification and PIN/password is not correctly entered the IVR returns to normal navigation (FIG. 6, step 765) and does not delete the authentication requirement.

The following is an example of using multiple features of the present invention to customize an existing IVR. For example, a university professor wants to provide midterm and final grades to students calling his office via his voice mail system. Professor adds a new shortcut option to his voice mail prompt to allow students to retrieve midterm and final grades. See FIG. 1D for voice mail prompts prior to customization. Additionally, the professor adds an authentication level requiring students to enter a student ID and social security number to hear the list of grades.

Steps 1-7 discusses how the professor created the shortcut, steps 8-10 discusses how he ran the shortcut, and steps 11-14 discusses how the professor configured the new level of authentication he added to the menu:

1. Professor dials the telephone access number to his voice mail account and authenticates himself by entering his account number and 4-digit pin. (FIG. 3, step 405).

2. IVR retrieves customer's shortcuts, hidden options and levels of authentication, if any, from the host database or IVR hard disk drive. (FIG. 3, step 410).

3. IVR plays shortcut usage instruction prompt: "To run a short cut at any time press or say *1. To create shortcut code at any time, press or say *9. To hide items in current menu, press or say *2. To enter shortcut editing mode, press or say *0. To set extra security press or say *8." (FIG. 3, step 415).

4. Professor hears the prompt: "Press or say 1 to hear Professor Black's office hours. Press or say 2 to speak with Professor Black. Press or say 3 to speak with my administrative assistant." (FIG. 1D, step 140).

5. Professor presses or says *9 (FIG. 3, step 490) which -adds current position in IVR vector to the user's shortcut configuration. (FIG. 3, step 490, 500).

6. IVR requests professor to record an appropriate shortcut prompt. (FIG. 3, step 505). In this case, the Professor records "Retrieve grades." Note: The IVR will decide which actual digit the student will need to select to access the shortcut. This allows the Professor the benefit of not having to worry about which digit to select and avoids conflicts from choosing inconsistent digits. The IVR will say "Press or say <option number>to" then insert the user recorded prompt.

7. The IVR goes back to next step in IVR vector. (FIG. 3, step 420).

8. Professor enters *1 to run shortcut code detect. (FIG. 3, step 460).

9. The IVR plays the list of saved shortcode prompts and prompts the Professor to select one or exit. (FIG. 3, step 465). In this case, the IVR plays "Press or say <option number selected by IVR>to retrieve grades. Make a selection or exit by pressing or saying **."

10. Professor selects shortcut by pressing or saying <option number selected by IVR>. (FIG. 3, step 470).

11. Professor presses or says *8 to enter the authentication code. (FIG. 3, step 450).

12. IVR plays prompt "Press or say *1 to add an authentication requirement to access this menu. Press or say *2 to delete a level of authentication to menu." (FIG. 6, step 725).

13. Professor presses or says *1 to add a level of authentication to this menu. (FIG. 6, step 730). IVR prompts Professor to enter one or more identification and PIN/password, then IVR system repeats the identification and PIN/password after the numbers are entered to confirm the entry. Professor enters the student ID and social security number for each student in his class. (FIG. 6, step 735).

14. The IVR prompts Professor to record a message or attach a file or pathname of file (if using a web browser) to play to the authenticated user. The professor records a message including the entire list of student ids and their grades that is played if the IVR authenticates the student's identification and PIN/password. (FIG. 6, step 760).

15. The IVR returns to next step in IVR vector. (FIG. 6, step 765).

16. Professor hangs up and the IVR saves changes to database. (FIG. 3, step 495, 510).

When student dials the professor's office number:

1. Student hears the prompt "Press or say 1 to hear Professor's office hours. Press or say 2 to speak with Professor. Press or say 3 to speak with my administrative assistant. Press or say <option number>to retrieve grades." Note the student does not have to wait for the prompt to end before making a selection.

2. The student presses or says <option number>to retrieve grades.

3. The IVR prompts the student for his identification and PIN/password. The student enters his student id and social security number. The IVR authenticates the identification and PIN/password with the saved identification and PIN/password. If correct, the IVR plays the message that included the list of student ids and their grade.

FIG. 7A shows data structure 800 as an example of how to organize the information stored in the host database 250 required to create a shortcut. The information in the data structure is collected by the IVR 310 using DTMF or ASR resources, or alternatively via the web server 220 when the customer is making edits to an IVR menu structure using their web browser. The customer's first and last name is collected when the customer logs into his server-based account. Data structure 800 also includes the navigation path for the shortcut, the option number selected by the Create Shortcut mode software, and the host database 250 location of the recorded new voice prompt to remind the customer the shortcut exists.

FIG. 7B shows data structure 804 as an example of how to organize information stored in host database 250 required to hide menu options. The IVR collects information in this data structure using DTMF or ASR resources, or alternatively via the web server 220 when the customer is making edits to an IVR menu structure using their web browser. The customer's first and last name is collected when the customer logs into his server-based account. The hidden menu option and the navigation path to reach the hidden menu option are stored in the data structure 804 as well as the IVR prompt for the hidden menu option.

FIG. 7C shows data structure 808 as an example of how to organize information stored in host database 250 required to configure an authentication code. The customer's first and last name is collected when the customer logs into his server-based account. The navigation path of the authentication code is stored in the data structure as well as the identification and PIN/password the user must enter to successfully access restricted menus and menu options. Additionally the customer may want to present a file or message to the user that successfully authenticated themselves. In this case, data structure 808 will include a pathname, i.e., location of a file stored in the host database 250 or elsewhere on a file server, or the location of a message prompt stored in the host database 250.

As will be appreciated, in FIGS. 7A-7C the prompts do not need to be saved in every data structure.

A number of variations and modifications of the invention can be used. It would be possible to provide for some features of the invention without providing others.

For example in one alternative embodiment, the logic of the present invention is implemented as software, hardware (e.g., logic circuit), or as a combination thereof.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for customizing an Interactive Voice Response unit, comprising:
    providing an interactive voice response unit (IVR), the IVR comprising a menu structure comprising a plurality of menus, each menu comprising a plurality of options that are selectable by a user, wherein the plurality of menus and each menu's respective plurality of options define a plurality of potential navigation paths for the user through the menu structure;
    receiving, from the user, a request to change the menu structure wherein, the request to change the menu structure is one or more of a request to hide a portion of the plurality of menus and a request to require authentication for a portion of the plurality of menus;
    effecting the requested change to the menu structure; and
    associating the changed menu structure with the requesting user.

2. The method of claim 1, wherein the IVR comprises resource cards to handle digit collection from dual tone multi-frequency telephones, automatic speech recognition resources to detect user voice responses, and voice processing resources to record the user's prompts.

3. The method of claim 1, further comprising:
    providing the user with at least two of the following options:
    creating a new navigation path;
    hiding a menu option;
    editing a new navigation path;
    adding an authentication requirement to a selected menu; and
    deleting an authentication requirement from a selected menu.

4. The method of claim 1, wherein the requested change includes creation of new navigation path.

5. The method of claim 4, wherein the effecting and associating steps comprise:
    creating a new navigation path at a location selected by the user;
    saving the new navigation path in a configuration file associated with the user; and
    recording a prompt from the user to indicate the new navigation path.

6. The method of claim 1, wherein the requested change is a change to a new navigation path configured by the user.

7. The method of claim 5, wherein, in the creating and saving steps, a current position vector of the user is saved and associated with the user.

8. The method of claim 5, further comprising:
    playing the recorded prompt to the user the next time the user is serviced by the IVR.

9. The method of claim 1, wherein the requested change is to hide at least one of a menu and an option.

10. The method of claim 9, wherein the effecting and associating steps comprise:
    adding the at least one of a menu and an option to a set of menus and/or options to hide in a selected navigation path; and
    saving the modified set of menus and/or options in a configuration file associated with the user.

11. The method of claim 9, further comprising:
    receiving a request from the user to play the hidden at least one of a menu and an option; and
    playing the at least one of a menu and an option to the user.

12. The method of claim 11, further comprising:
    determining whether the at least one of a menu and an option is eligible to be hidden;
    when the at least one of a menu and an option is eligible to be hidden, performing the effecting and associating steps; and
    when the at least one of a menu and an option is ineligible to be hidden, not performing the effecting and associating steps.

13. The method of claim 1, wherein the requested change is to add an authentication requirement associated with at least one of a menu and an option.

14. The method of claim 13, further comprising:
    prompting the user to enter authentication information; and
    prompting the user at least one of to attach a file, enter a pathname to the file; and to record a message to play to an authenticated user.

15. The method of claim 1, wherein the requested change is to delete an authentication requirement associated with at least one of a menu and an option.

16. The method of claim 15, further comprising:
    prompting the user to enter authentication information;
    validating the entered authentication information;
    when the authentication information is successfully validated, performing the effecting step; and
    when the authentication information is unsuccessfully validated, not performing the effecting step.

17. The method of claim 3, wherein the user is provided with all of the options.

18. The method of claim 1, wherein the menu structure is associated with a server-based account of the user and further comprising, before the receiving step:
    prompting the user for authentication information;
    receiving the authentication information;

validating the authentication information;
when the authentication information is successfully validated, performing the receiving step; and
when the authentication information is unsuccessfully validated, not performing the receiving step.

19. The method of claim 6, further comprising:
selecting a shortcut code and associating the shortcut code with the new navigation path, whereby the user selects the new navigation path by entering the shortcut code.

20. The method of claim 1, wherein the change request is received through at least one of an audio and visual interface.

21. The method of claim 1, wherein the requested change is an edit to a new navigation path previously configured by the user.

22. The method of claim 11, further comprising:
restoring the hidden at least one of a menu and an option.

23. The method of claim 1, wherein the IVR is associated with a plurality of user accounts, each user account corresponding to a unique user, wherein each user has a corresponding set of changes to the menu structure, and wherein the sets of changes are different from one another.

24. A computer readable medium comprising instructions capable of being executed by a computer to perform the steps of claim 1.

25. A logic circuit configured to perform the steps of claim 1.

26. An Interactive Voice Response unit (IVR), comprising:
a processor operable to:
a menu structure comprising a plurality of menus, each menu comprising a plurality of options that are selectable by a user, wherein the plurality of menus and each menu's respective plurality of options define a plurality of potential navigation paths for the user through the menu structure;
receive, from the user, a request to change the menu wherein, the request to change the menu structure is one or more of a request to hide a portion of the plurality of menus and a request to require authentication for a portion of the plurality of menus;
effect the requested change to the menu structure; and
associate the changed menu structure with the requesting user.

27. The IVR of claim 26, further comprising:
resource cards to handle digit collection from dual tone multi-frequency telephones, automatic speech recognition resources to detect user voice responses, and voice processing resources to record the user's prompts.

28. The IVR of claim 26, wherein the processor is further operable to provide the user with at least two of the following options:
creating a new navigation path;
hiding a menu option;
editing a new navigation path;
adding an authentication requirement to a selected menu; and
deleting an authentication requirement from a selected menu.

29. The IVR of claim 26, wherein the requested change includes creation of new navigation path.

30. The IVR of claim 28, wherein the effecting and associating functions comprise the operations of:
creating a new navigation path at a location selected by the user;
saving the new navigation path in a configuration file associated with the user; and
recording a prompt from the user to indicate the new navigation path.

31. The IVR of claim 26, wherein the requested change is a change to a new navigation path configured by the user.

32. The IVR of claim 30, wherein, in the creating and saving operations, a current position vector of the user is saved in a file associated with the user.

33. The IVR of claim 30, wherein the processor is further operable to play the recorded prompt to the user the next time the user is serviced by the IVR.

34. The IVR of claim 26, wherein the requested change is to hide at least one of a menu and an option.

35. The IVR of claim 34, wherein the effecting and associating functions comprise the operations of:
adding the at least one of a menu and an option to a set of menus and/or options to hide in a selected navigation path; and
saving the modified set of menus and/or options in a configuration file associated with the user.

36. The IVR of claim 34, wherein the processor is further operable to receive a request from the user to play the hidden at least one of a menu and an option and play the at least one of a menu and an option to the user.

37. The IVR of claim 36, wherein the processor is further operable to:
determine whether the at least one of a menu and an option is eligible to be hidden;
when the at least one of a menu and an option is eligible to be hidden, perform the effecting and associating functions; and
when the at least one of a menu and an option is ineligible to be hidden, not perform the effecting and associating functions.

38. The IVR of claim 26, wherein the requested change is to add an authentication requirement associated with at least one of a menu and an option.

39. The IVR of claim 38, wherein the processor is further operable to:
prompt the user to enter authentication information; and
prompt the user at least one of to attach a file, enter a pathname to the file; and to record a message to play to an authenticated user.

40. The IVR of claim 26, wherein the requested change is to delete an authentication requirement associated with at least one of a menu and an option.

41. The IVR of claim 40, wherein the processor is further operable to:
prompt the user to enter authentication information;
validate the entered authentication information;
when the authentication information is successfully validated, perform the effecting function; and
when the authentication information is unsuccessfully validated, not perform the effecting function.

42. The IVR of claim 28, wherein the user is provided with all of the options.

43. The IVR of claim 26, wherein the menu structure is associated with a server-based account of the user and wherein the processor is further operable to perform, before the receiving function, the functions of:
prompting the user for authentication information;
receiving the authentication information;
validating the authentication information;
when the authentication information is successfully validated, performing the receiving function; and
when the authentication information is unsuccessfully validated, not performing the receiving function.

44. The IVR of claim 29, wherein the processor is further operable to select a shortcut code and associate the shortcut code with the new navigation path, whereby the user selects the new navigation path by entering the shortcut code.

45. The IVR of claim 26, further comprising:
at least one of an audio and visual interface.

46. The IVR of claim 26, wherein the requested change is an edit to a new navigation path previously configured by the user.

47. The IVR of claim 36, wherein the processor is further operable to restore the hidden at least one of a menu and an option.

48. The IVR of claim 26, wherein the IVR is associated with a plurality of user accounts, each user account corresponding to a unique user, wherein each user has a corresponding set of changes to the menu structure, and wherein the sets of changes are different from one another.

49. An electronic memory in a contact center, comprising:
first and second user identifiers;
a menu structure comprising a plurality of menus, each menu comprising a plurality of options that are selectable by a user, wherein the plurality of menus and each menu's respective plurality of options define a plurality of potential navigation paths for the user through the menu structure;
a first set of changes to the menu structure associated with the first user identifier; and
a second set of changes to the menu structure associated with the second user identifier, wherein the first and second sets are different, and
wherein, one or more of the first and second set of changes to the menu structure include one or more of a request to hide a portion of a menu and a request to require authentication for a portion of a menu.

* * * * *

UNITED STATES PATENT AND TRADEMARK OFFICE
CERTIFICATE OF CORRECTION

PATENT NO. : 7,515,695 B1  
APPLICATION NO. : 10/736923  
DATED : April 7, 2009  
INVENTOR(S) : Chan et al.

Page 1 of 1

It is certified that error appears in the above-identified patent and that said Letters Patent is hereby corrected as shown below:

Column 19, lines 27-42, the element of the claim reading "a processor operable to:" should be moved below the element of the claim reading "a menu structure" as follows:

26. An Interactive Voice Response unit (IVR), comprising:
"a processor operable to:"
a menu structure comprising a plurality of menus, each menu comprising a plurality of
  options that are selectable by a user, wherein the pluraity of menus and each menu's
  respective plurality of options define a plurality of potential navigation paths for the
  user through the menu structure; and
--a processor operable to:--
    receive, from the user, a request to change the menu wherein, the request to change
      the menu structure is one or more of a request to hide a portion of the plurality of
      menus and a request to require
      authentication for a portion of the plurality of menus;
    effect the requested change to the menu structure; and
    associate the changed menu structure with the requesting user.

Signed and Sealed this

Tenth Day of November, 2009

David J. Kappos  
*Director of the United States Patent and Trademark Office*